United States Patent Office 3,442,841
Patented May 6, 1969

3,442,841
ASPHALT-ETHYLENE/VINYL ACETATE COPOLYMER COMPOSITIONS
Robert L. Adelman, Wilmington, Del., assignor to E. I. du Pont de Nemours and Company, Wilmington, Del., a corporation of Delaware
No Drawing. Filed Apr. 13, 1962, Ser. No. 187,195
Int. Cl. C08h *13/08*
U.S. Cl. 260—28.5        4 Claims This invention relates to an improved asphalt composition. More particularly, this invention relates to an improved asphalt composition comprising asphalt and an ethylene/vinyl acetate copolymer.

Several physical properties of asphalt compositions are commonly used to characterize the adaptability of a particular asphalt to various uses. For example, many uses require an asphalt which has a specific minimum softening point temperature.

The penetration ratio is another important property of asphalt. The penetration ratio is an indication of the amount of hardening which occurs when the temperature of an asphalt is lowered. Penetration ratio is commonly expressed as the ratio of the penetration at 39.2° F. divided by the penetration at 77° F., multiplied by 100. Since a higher penetration signifies a softer asphalt, an increased penetration ratio indicates that less hardening occurs as the temperature decreases.

Generally, the temperature range over which an asphalt is useful for a particular application is determined by the hardness requirements of that application and the effect of temperature on hardness. However, most asphalts are not useful over wide temperature ranges. An asphalt which is suitable for use at low temperatures as would be found in areas which experience low sub-freezing winter temperatures, ordinarily would be too soft at high temperatures for use in areas where hot summer temperatures are common. Similarly, an asphalt which has a sufficiently high softening point temperature, and a satisfactory degree of hardness for use at high temperatures may have a degree of hardness approaching brittleness at low temperatures. Consequently, in an area where extreme temperature fluctuations are common, asphalt roads may be much too soft in the summer and may become so hard in the winter as to crack or breakup quite readily.

Clearly, it is desirable to obtain an asphalt which is useful over a wide range of temperatures, that is, an asphalt which has a sufficiently high softening point temperature with an operable penetration at the higher temperatures, but which does not become unduly hard at low temperatures, i.e., has a relatively large penetration ratio.

Another significant property for the characterization of asphalt is toughness-tenacity, which is a measure of the work input necessary to dislodge an imbedded, hemispherical head from an asphalt sample. In some uses of asphalt, particularly in road construction, particles such as gravel are imbedded in the asphalt and it is important in order to obtain satisfactory road wear that the gravel does not work itself loose. Therefore, it is desirable to obtain an asphalt that has a high degree of toughness-tenacity.

Many uses of asphalt require that the asphalt have substantial elasticity. Torsional recovery is a measure of elasticity of asphalt, and hence, is still another significant property.

Where an asphalt composition is incorporated into a rigid form, for example, to produce battery boxes, impact strength becomes an important property.

It is an object of this invention to provide an improved asphalt composition. Another object is to provide a modified asphalt which has a higher softening point temperature than a corresponding unmodified asphalt. Still another object is to provide a modified asphalt which has a larger penetration ratio than a corresponding unmodified asphalt. A further object is to provide a modified asphalt which has a higher softening point and a larger penetration ratio than a corresponding unmodified asphalt. A still further object is to provide a modified asphalt with a greater degree of toughness-tenacity than a corresponding unmodified asphalt. Also, another object is to provide a modified asphalt which has a greater degree of torsional recovery than a corresponding unmodified asphalt. An additional object is to provide a modified asphalt with a higher impact strength than a corresponding unmodified asphalt.

These and other objects are attained by a composition comprising asphalt and dispersed therein 0.1–40% of an ethylene/vinyl acetate copolymer based on the combined weight of said asphalt and copolymer, said copolymer containing 5–40% by weight of vinyl acetate.

The ethylene/vinyl acetate copolymers employed in this invention may be prepared by suitable methods familiar in the art. Thus, a process as shown in U.S.P. 2,200,429 or U.S.P. 2,703,794, for example, may be used. Copolymers containing 5–40% by weight vinyl acetate may be used in this invention. In some applications, particularly where more than 5% polymer is blended with asphalt, a vinyl acetate content of 27–33% in the copolymer is preferred. Vinyl acetate content of the copolymer may be determined by infrared analysis or by saponification number determination. The melt index of these copolymers does not appear to be a critical factor in the effectiveness of the copolymers to modify asphalt in accord with this invention. Thus, the readily prepared copolymers, for example, those having melt indices (ASTM Test Method D–1238–57T) in the range of about 0.5 to 1000 may be used.

The ethylene/vinyl acetate copolymers may be dispersed into asphalt in any suitable manner. Compositions containing relatively small amounts of copolymer such as 5% or less copolymer based on the weight of asphalt, may be prepared by blending at temperatures of about 300–330° F. using high-speed agitation for 20 to 30 minutes. Compositions containing larger amounts of copolymer may be more conveniently prepared by blending in a sigma blade mixer at about 300° F. for 30 to 40 minutes. Use of a powdered or finely granulated form of copolymer will reduce the required mixing time.

The ethylene/vinyl acetate copolymers used in this invention are completely compatible with asphalt in all proportions. The exact amount of copolymer to be blended with asphalt depends primarily upon the specific asphalt being modified and the ultimate use to which it will be put. For coatings, crack and joint sealers, paper lamination and saturation compositions, sound deadeners and automotive undercoatings, and the like, 0.1–5% of copolymer based on the combined weight of the asphalt and copolymer will provide significant improvements in the properties of the asphalt, although at least 1% copolymer is generally preferred for such purposes. Other applications may require larger amounts of copolymer, especially where it is desired to make rigid structures, such as battery boxes, in which cases, up to about 40% copolymer, based upon the combined weight of the asphalt and copolymer, may be used. Larger amounts than 40% copolymer are compatible with asphalt, however for most uses 40% copolymer based upon the combined weight of asphalt and copolymer, is a practical upper limit.

Some of the improvements attained by modification of asphalt with an ethylene/vinyl acetate copolymers are illustrated by the following examples which are designed only to show some of the advantages of this invention and are not intended to limit the scope thereof.

In the following examples, the physical property data shown were obtained by the procedures indicated below:

(1) Softening point temperature was determined by ring and ball method provided by ASTM D28–51T;

(2) Penetration was determined by the procedure of ASTM D–5–52;

(3) Torsional recovery was measured by the following method: A bolt and disk assembly was suspended and centered by means of a notched spider in a standard 3-ounce seamless ointment can having a diameter of approximately 2 inches. The disk used had a diameter of 1.125 inches and was 0.375 inch thick. The melted asphalt sample was poured into the can until it was flush with the surface of the disk. The assembly was then conditioned at 77° F. for a minimum of 2 hours before testing. By means of wrench and locked nuts on the bolts, the disk was rotated through an arc of 180° relative to the sample container and released immediately. The angle of the recovery was measured after 30 seconds and 30 minutes and values of percent of recovery were recorded.

(4) Toughness-tenacity was determined by a method described by Benson in "Roads and Streets," April 1955, which essentially consists in determining the relation between applied load and elongation when a hemisphere of 7/16 inch radius, embedded in a mass of asphalt, is pulled out at a constant rate of 12 inches per minute. The load first increases rapidly to a peak and then falls again as the sample forms a rope between the hemisphere and the body of the asphalt. The entire work (in inch-pounds) done upon the samples is the toughness; the tenacity is the work (in inch-pounds) done after the samples begin to resist further elongation.

(5) Izod impact strength was determined in accord with ASTM D–256, using a 3-pound hammer.

Example 1

This example shows the improvement in the physical properties of asphalt which is attained by modification thereof with an ethylene/vinyl acetate copolymer. Five different ethylene/vinyl acetate copolymers were blended with an 85/100 penetration grade asphalt from Lagunillas crudes, in the proportion of 5 parts by weight copolymer to 100 parts asphalt, for each of 5 runs. The compositions were prepared by mixing at a temperature of about 300° F. for 30 minutes, continually agitating with a high-speed mixer. The resultant blends appeared smooth and homogenous. To provide a control for comparative analysis, an unmodified asphalt sample was also evaluated. Table 1 summarizes the data obtained.

TABLE 1

| | Run | | | | | |
|---|---|---|---|---|---|---|
| | 1 | 2 | 3 | 4 | 5 | 6 |
| Character of Polymer [1] | ([2]) | ([3]) | ([4]) | ([5]) | ([6]) | ([7]) |
| Softening Point, °F | 116 | 152 | 143 | 131 | 132 | 128 |
| Penetration: | | | | | | |
| 77° F./100 gm./5 sec | 85 | 46 | 47 | 62 | 60 | 72 |
| 32° F./200 gm./6 sec | 26 | 24 | 24 | 27 | 26 | 39 |
| Penetration Ratio | 30.6 | 52.2 | 51.1 | 43.6 | 43.3 | 54.2 |
| Tortional Recovery Percent: | | | | | | |
| After 30 seconds | 3 | 12 | 12 | 30 | 32 | 28 |
| After 30 minutes | 4 | 24 | 17 | 46 | 45 | 45 |
| Toughness-Tenacity: | | | | | | |
| Tenacity, in.-lbs | 2 | 0 | 0 | 19 | 7 | 38 |
| Toughness, in.-lbs | 21 | 35 | 29 | 54 | 47 | 71 |

[1] Percent VA refers to the weight percent of vinyl acetate in the ethylene/vinyl acetate copolymer. MI refers to the melt index of the copolymer as determined by ASTM D1238–57T.
[2] Unmodified.
[3] 9% VA, 0.8 MI.
[4] 7% VA, 20 MI.
[5] 29% VA, 15.7 MI.
[6] 28.6% VA, 22.4 MI.
[7] 31.4% VA, 22.4 MI.

Table 1 clearly shows the significant improvements attained by modification of asphalt with an ethylene/vinyl acetate copolymer. In each run, the softening point temperature was raised considerably, and the penetration ratio was increased without adversely effecting the low temperature penetration. Hence, the asphalt modified as shown in Table 1 is useful over a much broader temperature range than the corresponding unmodified asphalt. Each modified asphalt in this example showed a significant increase in torsional recovery, indicating that the ethylene/vinyl acetate copolymers impart a greater degree of elasticity to asphalt. In addition, the copolymers increased the toughness-tenacity of the asphalt. Therefore, the asphalt modified as shown, has a greater retention of particles, such as gravel, imbedded therein.

Example 2

This example illustrates the improvements obtained by modifying asphalt with comparatively small amounts of an ethylene/vinyl acetate copolymer. In this example, two samples of the asphalt employed in Example 1 were modified with 1% and 3% respectively, of an ethylene/vinyl acetate copolymer, based upon the combined weight of the asphalt and copolymer. The copolymer had a vinyl acetate content of 9% and a 0.8 melt index. Table 2 shows the results achieved.

TABLE 2

| | Run | |
|---|---|---|
| | 7 | 8 |
| Percent Copolymer Blended with Asphalt [1] | 1% | 3% |
| Softening Point, °F | 122 | 131 |
| Penetration: | | |
| 77° F./100 gm./5 sec | 67 | 50 |
| 32° F./200 gm./6 sec | 22 | 18 |
| Penetration Ratio | 32.8 | 36 |

[1] Based upon the combined weight of asphalt and copolymer.

The data shown in Table 2 establishes that even small amounts of an ethylene/vinyl acetate copolymer significantly improves the physical properties of asphalt.

Example 3

This example shows the effect of larger amounts of an ethylene/vinyl acetate copolymer on asphalt. The asphalt used in Example 1 was selected for evaluation. Different ethylene/vinyl acetate copolymers were blended with the asphalt in the proportion of 5 parts by weight copolymer to 15 parts asphalt, for each of 4 runs. The samples were prepared by blending in a sigma blade mixer at a temperature of 300° F. and for 30 minutes. A 5 to 10 minute additional mix cycle was needed during which vacuum was applied to remove entrained air. This last step was necessary in order to obtain "pinhole-free" test samples. Table 3 shows the results obtained. For convenience of reference, data for the unmodified asphalt of Run 1, Example 1, are reproduced in this table.

TABLE 3

| | Run | | | | | |
|---|---|---|---|---|---|---|
| | 1 | 9 | 10 | 11 | 12 | 13 |
| Character of Polymer [1] | ([2]) | ([3]) | ([4]) | ([5]) | ([6]) | ([7]) |
| Softening Point, °F | 116 | 215 | 220 | 165 | 160 | 165 |
| Izod Impact Strength at 32° F.: | | | | | | |
| Notched, Energy, ft. lb./in. of notch | ([8]) | 0.18 | 0.17 | 0.16 | 0.19 | 0.29 |
| Unnotched, Energy, ft. lb./in. | ([8]) | 0.73 | 0.34 | 6.41 | 6.04 | 6.17 |

[1] Percent VA refers to the weight percent of vinyl acetate in the ethylene/vinyl acetate copolymer. MI refers to the melt index of the copolymer as determined by ASTM D1233–57T.
[2] Unmodified.
[3] 9% VA, 0.8 MI.
[4] 7% VA, 20 MI.
[5] 29% VA, 15.7 MI.
[6] 31.4% VA, 56 MI.
[7] 32.2% VA, 23.2 MI.
[8] Too low for accurate measurement.

As shown in Table 3, an asphalt containing about 25% of an ethylene/vinyl acetate copolymer which has a relatively small vinyl acetate content, has a much higher softening point temperature than a corresponding unmodified asphalt. The copolymers containing larger amounts of vinyl acetate not only raised the softening point temperature considerably, but in addition, produced a vast increase in impact strength.

The foregoing examples have shown the improvements that an ethylene/vinyl acetate copolymer produces in one particular asphalt, namely an 85/100 penetration grade asphalt from Lagunillas crudes. However, this invention is not restricted to the modification of any one particular asphalt. This invention is applicable to all types of asphalt, either naturally occurring or derived from crude oils of various sources.

The following examples illustrate the effect of an ethylene/vinyl acetate copolymer in an oxidized asphalt, namely, a blown asphalt from Lagunillas crudes.

Example 4

This example demonstrates the improvements achieved in a blown asphalt by the addition thereto of an ethylene/vinyl acetate copolymer. Four different ethylene/vinyl acetate copolymers were added to the blown asphalt in the proportion of 5 parts copolymer to 100 parts asphalt. These compositions were prepared by blending at about 300° F. for 30 minutes with continuous agitation supplied by a high speed mixer, except that it was necessary to increase the temperature to about 329° F. in order to disperse the copolymer used for Run 16. All of the blends were smooth and well dispersed. The data obtained are tabulated in Table 4.

TABLE 4

|  | Run | | | | |
| --- | --- | --- | --- | --- | --- |
|  | 14 | 15 | 16 | 17 | 18 |
| Character of Polymer [1] | ([2]) | ([3]) | ([4]) | ([5]) | ([6]) |
| Softening Point, °F | 190 | 244 | 241 | 236 | 230 |
| Penetration: | | | | | |
| 77° F./100 gm./5 sec | 21 | 21 | 25 | 22 | 22 |
| 32° F./200 gm./6 sec | 8 | 20 | 21 | 20 | 20 |
| Penetration Ratio | 38.1 | 95.3 | 84 | 90.8 | 90.8 |

[1] Percent VA refers to the weight percent vinyl acetate in the ethylene/vinyl acetate copolymer. MI refers to the melt index of the copolymer as determined by ASTM D1238-57T.
[2] Unmodified.
[3] 9% VA, 0.8 MI.
[4] 29% VA, 15.7 MI.
[5] 31.4% VA, 56 MI.
[6] 32.2% VA, 23.2 MI.

Table 4 clearly indicates that 5% of an ethylene/vinyl acetate copolymer added to a blown asphalt gives a large increase in the softening point temperature and a remarkable improvement in the penetration ratio.

Example 5

This example shows the improvements derived by the addition of relatively small amounts of an ethylene/vinyl acetate copolymer to a different blown asphalt than that used in Example 4. Two samples containing 1% and 3% respectively, based on the combined weight of asphalt and copolymer, of an ethylene/vinyl acetate copolymer having a 9% vinyl acetate content and a melt index of 0.8 were prepared by the procedure indicated in Example 4. The data obtained are shown in Table 5.

TABLE 5

|  | Run | | |
| --- | --- | --- | --- |
|  | 19 | 20 | 21 |
| Percent Copolymer Blended with Asphalt [1] | ([2]) | 1% | 3% |
| Softening Point, °F | 182.5 | 191 | 212 |
| Penetration: | | | |
| 77° F./100 gm./5 sec | 22 | 19 | 17 |
| 32° F./200 gm./6 sec | 14 | 13 | 13 |
| Penetration Ratio | 63.7 | 68.4 | 76.4 |

[1] Based on the combined weight of asphalt and copolymer.
[2] Unmodified.

The data shown in Table 5 show the significant improvements attained in blown asphalt by the addition thereto of very small amounts of an ethylene/vinyl acetate copolymer.

Example 6

The unmodified asphalt used in Example 4 had an Izod impact strength of 0.12 ft.-lbs./in. A blend of 75 parts by weight of this asphalt and 25 parts of an ethylene/vinyl acetate copolymer containing 32.2% vinyl acetate and having a melt index of 23.2, was prepared by blending in a sigma blade mixer at about 300° F. for 30 minutes, followed by de-aeration with vacuum at 300° F. The resultant blend had an Izod impact strength of over 6.0.

As will be apparent to one skilled in the art, many widely different embodiments of this invention may be practiced without departing from the spirit and scope thereof. Therefore, it is to be understood that this invention is not limited except as defined by the appended claims.

I claim:

1. A composition comprising asphalt and dispersed therein 0.1–40% of an ethylene/vinyl acetate copolymer based on the combined weight of said asphalt and copolymer, said copolymer containing 5–40% by weight of vinyl acetate.

2. A composition comprising asphalt and dispersed therein 0.1–5% of an ethylene/vinyl acetate copolymer based on the combined weight of said asphalt and copolymer, said copolymer containing 5–40% by weight of vinyl acetate.

3. A composition comprising asphalt and dispersed therein 1–5% of an ethylene/vinyl acetate copolymer based on the combined weight of said asphalt and copolymer, said copolymer containing 5–40% by weight of vinyl acetate.

4. A composition comprising asphalt and dispersed therein 5–40% of an ethylene/vinyl acetate copolymer based on the combined weight of said asphalt and copolymer, said copolymer containing 27–33% by weight of vinyl acetate.

References Cited

UNITED STATES PATENTS 2,475,699  7/1949  Derksen _____ 260—28.5
2,877,196  3/1959  Reding _____ 260—28.5
2,703,794  3/1955  Roedel _____ 260—87.3

ALLAN LIEBERMAN, *Primary Examiner.*

H. S. KAPLAN, *Assistant Examiner.*